United States Patent [19]
Taoda et al.

[11] Patent Number: 5,943,950
[45] Date of Patent: Aug. 31, 1999

[54] UTENSILS FOR TABLE USE AND COOKING USE

[75] Inventors: Hiroko Taoda, 4-301 Inokoshi-jutaku, 70 Heiwagaoka 1-chome, Meito-ku, Nagoya-shi, Aichi 465; Kimiko Minowa, 151-Aza-Yakushiyama, Narumi-cho, Midori-ku, Nagoya-shi Aichi 458; Shigekazu Kato; Hiroaki Yokoi, both of Aichi, all of Japan

[73] Assignees: Hiroko Taoda; Kimiko Minowa, both of Aichi; Kato Manufacturing Corporation Limited, Komaki; Aiwa Corporation Limited, Iwakura, all of Japan

[21] Appl. No.: 08/940,019

[22] Filed: Sep. 29, 1997

Related U.S. Application Data

[63] Continuation of application No. 08/549,791, filed as application No. PCT/JP95/00678, Apr. 6, 1995, abandoned.

[30] Foreign Application Priority Data

Apr. 6, 1994 [JP] Japan ................................ 6-93683

[51] Int. Cl.$^6$ ............................ A47J 36/02; A47J 43/27
[52] U.S. Cl. .................. 99/485; 99/403; 99/422; 99/646 R; 210/763; 422/241; 422/905
[58] Field of Search ............................ 99/324, 344, 403, 99/422, DIG. 14, 646 R, 485; 422/186.3, 186, 905, 24, 211, 241, 240; 210/748, 763, 908, 910, 762, 904, 205, 94, 251, 206, 207, 208, 209

[56] References Cited

U.S. PATENT DOCUMENTS

| | | | |
|---|---|---|---|
| 4,810,510 | 3/1989 | Lever et al. | 99/482 X |
| 4,823,980 | 4/1989 | Ejiri | 99/344 X |
| 4,892,712 | 1/1990 | Robertson et al. | 422/186 |
| 4,977,302 | 12/1990 | Merigaud et al. | 99/DIG. 14 X |
| 5,126,111 | 6/1992 | Al-Ekabi et al. | 422/186.3 |
| 5,241,149 | 8/1993 | Watanabe et al. | 99/DIG. 14 X |
| 5,302,356 | 4/1994 | Shadman et al. | 422/186.3 |
| 5,399,842 | 3/1995 | Watanabe et al. | 99/DIG. 14 X |
| 5,447,803 | 9/1995 | Nagaoka et al. | 99/324 X |
| 5,449,467 | 9/1995 | Taoda et al. | . |
| 5,562,820 | 10/1996 | Taoda et al. | . |

OTHER PUBLICATIONS

Loose, Japan, vol. 42, No. 481, Apr. 1996.
New Technology Japan, vol. 22, No. 10, Jan. 1995.
"Catalyty" Photo–Catalytic Materials Pamphlet, Feb. 1997.
"Catalyty" Photo–Catalytic Materials Pamphlet, Jun. 1997.
Medical Equipment Journal of Japan, vol. 39, No. 6, Jun. 1995.

Primary Examiner—Reginald L. Alexander
Attorney, Agent, or Firm—Oblon, Spivak, McClelland, Maier & Neustadt, P.C.

[57] ABSTRACT

It is the object of the present invention to provide utensils for table use or cooking use, which can easily improve the taste of food and drink and make them tasty without using particular energy in a short time. The utensils for table use or cooking use according to the present invention have their surface coated with a film of titanium oxide; when they are exposed to sunrays, an electric light or the like, electrons and positive holes are formed on the film of titanium oxide on the surface thereof according to photocatalytic reaction, whose strong oxidation-reaction decomposes residual chlorine and organic compounds dissolved in water to remove the odor of chlorine and the odor of mold and makes clusters of water in food and drink small to improve the taste of food and drink and to make them tasty.

4 Claims, 1 Drawing Sheet

UTENSILS FOR TABLE USE AND COOKING USE

This application is a Continuation of application Ser. No. 08/549,791, filed on Jan. 26, 1996, abandoned which was filled as International Application No. PCT/JP95/00687, filed on Apr. 6, 1995.

TECHNICAL FIELD

The present invention relates to utensils for table use and cooking use, which have a function to improve the taste of food and drink and to make them tasty.

BACKGROUND ART

We have often known from experience that, for example, in regard to alcoholic drinks, while a cheap and low-grade whiskey has a rough and strong taste in the mouth, a high-grade one has a soft and mild taste in the mouth.

As a result of the investigation of these both whiskeys according to nuclear magnetic resonance (NMR), it was showed that a high-grade whiskey showed a curve of a thin and sharp peak of water in the chart obtained, and clusters of water in the whiskey had become smaller in comparison with the same of a cheap whiskey. It is considered generally that the taste of a whiskey is improved as the clusters of water become smaller (Nippon Nogeikagaku Kaishi, Vol. 60, No. 3, pp. 191–197 (1986)).

The clusters of water are defined as associated materials of water molecules such as $(H_2O)n$ according to hydrogen bonds.

Incidentally, various attempts have been performed hitherto with a view to improving the taste of water and alcoholic drinks in a short time without taking much time like an aging process. In the methods deemed to be effective up to now, a method for applying ultrasound onto beverages and drinks including alcohols and a method for irradiating far infrared rays onto them by using far infrared rays ceramics are cited as instances (Hiroo Takashima, Kogyo Chosakai, K Books 66, Easy Far Infrared Rays Engineering, p. 111 (1988)).

However, the former method needs an ultrasound generator and has problems in its complexity and energy cost; on the other hand, the latter method is convenient, but since the energy of far infrared rays discharged is small, it has a problem in its effect. In addition, both methods have a defect in taking much time.

Besides, the taste of drinking water are deteriorated by various organic compounds existing in city water such as the residual components of chlorine (residual chlorine) used for disinfecting city water, the odor of chlorine produced by a reaction between the residual chlorine and organic materials in water and the odor of mold incapable of being removed according to an activated sludge method.

The present invention has been accomplished from the above viewpoint, and it is an object of the present invention to provide utensils for table use or cooking use, which can easily improve the taste of food and drink and make them tasty without using particular energy in a short time.

In addition, it is another object of the present invention to provide utensils for table use or cooking use, which can easily improve the taste of drinking water, food and drink and make them tasty in a short time only by using light energy such as sunrays and an electric light.

Further, it is still another object of the present invention to provide utensils for tableware or cooking utensils, which can maintain a function and effect to improve the taste of drinking water, food and drink and to make them tasty semipermanently by using a film of titanium oxide having an advantage being durable, non-toxic and innoxious for health.

SUMMARY OF THE INVENTION

It is the object of the present invention to provide utensils for table use or cooking use, which can easily improve the taste of drinking water, food and drink and make them tasty without using particular energy in a short time.

The utensils for table use or cooking use according to the present invention have their surface coated with a film of titanium oxide; when they are exposed to sunrays, an electric light or the like, electrons and positive holes are formed on the film of titanium oxide on the surface thereof, whose oxidation-reaction decomposes residual chlorine to remove the odor of chlorine and the odor of mold in water and makes clusters of water in food and drink small to improve the taste of drinking water, food and drink, and make them tasty.

DISCLOSURE OF INVENTION

The present invention relates to utensils for table use or cooking use, which are characterized by that at least the surface of their side coming into contact with food and drink or cooking materials is coated with a film of titanium oxide.

When food and drink or cooking materials are put into the utensils for table use or cooking use according to the present invention, or the utensils according to the present invention (e.g., straw) are put into a vessel containing food and drink or cooking materials, electrons and positive holes are formed on the film of titanium oxide on the surface of the utensils according to photocatalytic reaction due to being exposed to sunrays, an electric light or the like, whose strong oxidation-reaction decomposes residual chlorine to remove the odor of chlorine and the odor of mold in water and makes clusters of water small to improve drinking water, food and drink, and make them tasty.

Examples of the utensils for table use or cooking use according to the present invention include various vessels such as a cup, glass, tumbler, jug, pitcher, bottle, thermos bottle, bowl, pan, kettle, pot, jug, pad, sake bottle, teacup, rice bowl and glass vessel of a mixer, and stick-like articles such as a spoon, pair of chopsticks, skewer, ladle, egg beater, toothpick, muddler and straw.

As materials of the utensils for table use or cooking use according to the present invention are used those having a required strength on which a film of titanium oxide can be formed; examples thereof include concrete, glass, plastics, ceramics, metals or the like.

The range of applying a film of titanium oxide in the present invention is generally the whole surface of an utensil; in vessel-like utensils, however, only the surface of the inside coming into contact with food and drink or cooking materials may be coated with the film. The utensils may be transparent or non-transparent; however, light permeates through utensils from the outside and can be irradiated onto the film of titanium oxide in transparent utensils, which is preferable in case of forming a film of titanium oxide on the inside of the utensils such as vessels and a straw.

The forms of the utensils for table use or cooking use according to the present invention may be square-pillar-like, column-like, ball-like, conic, gourd-shaped or rugby-ball-shaped. They may be also closed, may have also a lid or not, and in addition may be round-tube-like or square-tube-like.

A film of titanium oxide on the surface of the utensils for table use or cooking use according to the present invention may be prepared by making a titania sol from titanium alkoxide obtained according to a reaction between titanium tetrachloride and alcohol, applying it onto the surface of the utensils for table use or cooking use according to dip coating, spin coating, coating., spray coating or the like and then calcinating it, or the surface of titanium utensils for table use or cooking use may be heated and oxidized with a gas flame to make titanium oxide In addition, it may be prepared by coating the surface of the utensils for table use.. or cooking use with a suspension of ultrafine particles of titanium oxide according to dip coating, spin coating, coating, spray coating or the like, and then calcinating it. Moreover, the surface of the utensils for table use or cooking use may be coated with a film of titanium oxide according to known CVD, PVD, spattering, flame spray coating or the like.

If water, beverages such as Japanese sake or cooking materials are put into the thus obtained utensils for table use or cooking use, electrons and positive holes are formed on the film of titanium oxide on the surface of the utensils due to being exposed to sunrays, an electric light or the like, whose reaction makes clusters of water coming into contact with the film of titanium oxide on the surface of the utensils small to improve the taste of beverages and the like and make them soft and mild in a short time. In addition, if the article according to the present invention such as a spoon, pair of chopsticks or muddler is put into a vessel containing water, beverages such as Japanese sake or cooking materials, the taste of the beverages and the like is improved and they become soft and mild similarly due to being exposed to sunrays, an electric light or the like. If stirring is also performed in this case against the utensils for table use or cooking use according to the present invention, the taste of the beverages and the like is more improved.

As sources of light to be employed in the present invention can be exemplified the light of sunrays, incandescent lamp, fluorescent lamp, halogen lamp, xenon lamp, mercury lamp and UV lamp preferably. As light to be irradiated may be used light containing a lot of light with a short wavelength like ultraviolet rays; in addition, light with a long wavelength like visible light rays can be employed satisfactorily.

If metals of the platinum group such as platinum, rhodium and ruthenium, and/or iron, silver or the like are further deposited on the film of titanium oxide on said surface, the function and effect of improving the taste of beverages and the like are more increased. Besides, the film of titanium oxide may be further coated with a film of platinum or the like.

BEST MODE FOR CARRYING OUT THE INVENTION

Preferable examples of the present invention will be described in detail hereunder.

EXAMPLE 1

Figure 1:
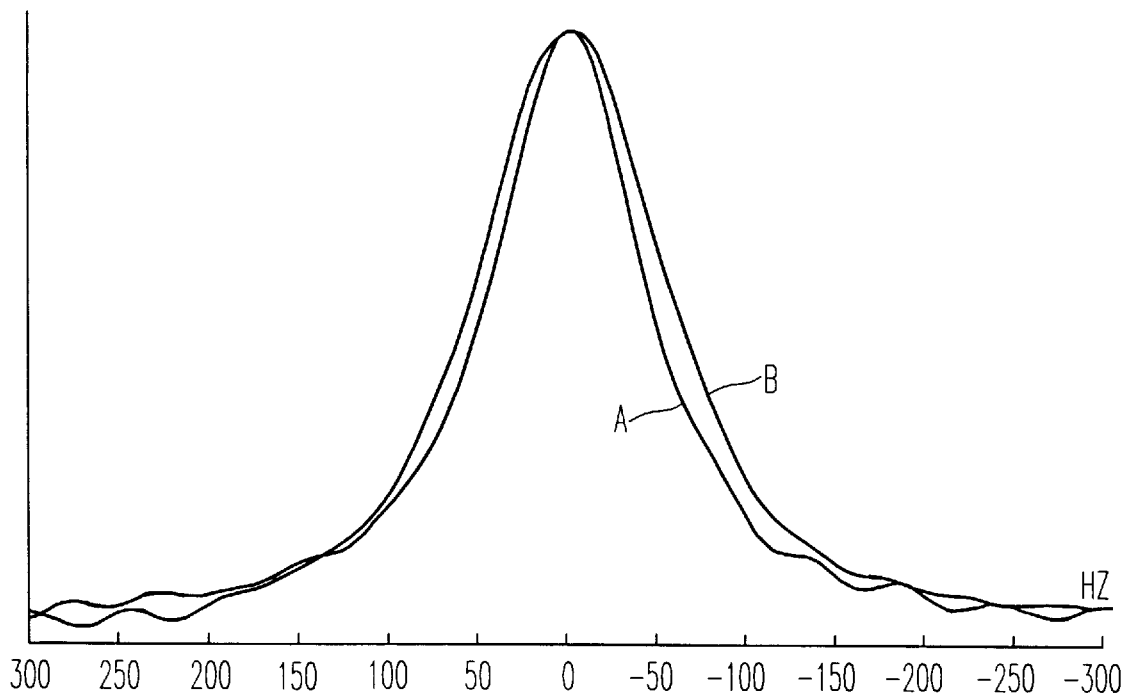
FIG. 1 shows the results of NMR measurement obtained by putting city water into a cup as an embodiment of the present invention, irradiating light thereon and then performing NMR measurement, and the results of NMR measurement obtained by putting city water into an ordinary heat-resistant glass cup, irradiating light thereon and then performing NMR measurement.
Explanation of the Symbols
A: Curve according to the NMR measurement of the water put into a cup as an embodiment of the present invention.
B: Curve according to the NMR measurement of the water put into an ordinary cup.
Figure 2:
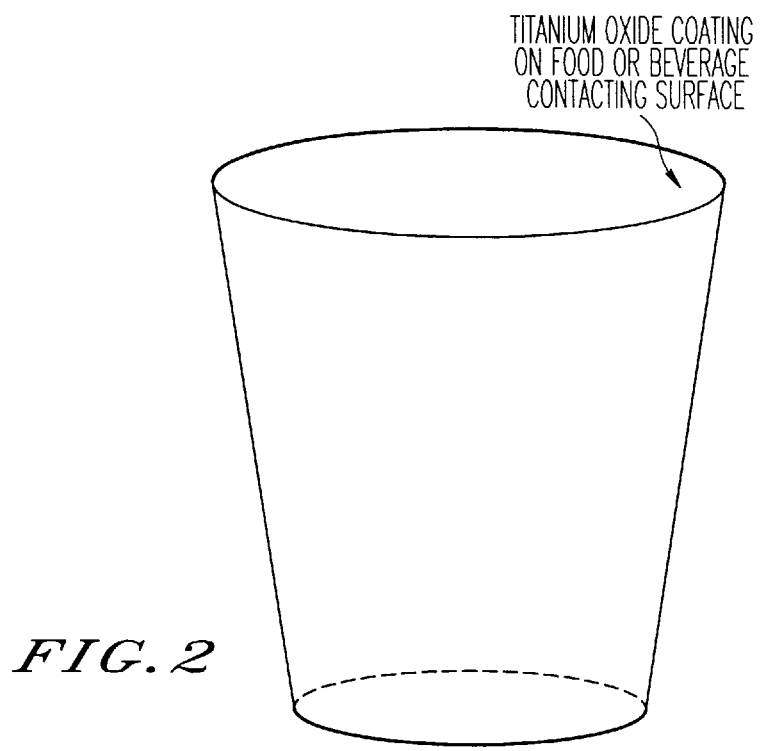
FIG. 2 shows one embodiment of the claimed utensil having the titanium oxide coating.

City water was put into a heat-resistant glass cup according to the present invention obtained by coating the surface with a titania sol liquid prepared from titanium alkoxide according to dip coating and calcinating it at 550° C. to coat the surface of the inside thereof with a film of titanium oxide, and light was irradiated thereon, and then the water was measured according to nuclear magnetic resonance (NMR). For comparison, city water was put into an ordinary heat-resistant glass cup coated with no film of titanium oxide, and light was irradiated thereon, and then the water was measured according to NMR. As the results are shown in FIG. 1, the curve A in the case of using the cup according to the present invention has a thin and sharp peak of water and shows clusters of water being become smaller compared with the curve B in the case of using the ordinary cup. As a result of applying the water to a sensory test actually, the water put into the cup according to the present invention had neither the odor of mold nor the odor of chlorine and was improved in the taste as soft, mild and tasty as the one of mineral water compared with the water put into the ordinary cup.

EXAMPLE 2

A muddler according to the present invention, which is obtained by coating the surface thereof with a suspension of ultrafine particles of titanium oxide according to spray coating and calcinating it at 600° C. to coat the surface thereof with a film of titanium oxide, was put into a glass containing a cheap whiskey diluted with water and it was stirred under the light of an electric lamp for several minutes; as a result, the taste of the whiskey was improved and the strong taste thereof in the mouth was removed and its taste became soft and mild like a high-grade whiskey. Besides, the odor of chlorine due to residual chlorine in the whiskey diluted with water was removed and it was delicious and tasty. Moreover, the same effect could be obtained when the muddler of the present invention was used for other beverages such as Japanese sake, wine and shochu.

EXAMPLE 3

Beer was sampled slowly to apply to a sensory test by using a glass straw according to the present invention obtained by coating the surface thereof with a titania sol liquid prepared from titanium alkoxide according to dip coating and clacinating it at 500° C. to coat the surface thereof with a film of titanium oxide; as a result, the taste of the beer was improved and the bitterness thereof was decreased and the taste of it became soft and mild. The same effect was obtained when other articles according to the present invention were used for beer.

INDUSTRIAL APPLICABILITY

As described above, the articles according to the present invention relate to the utensils for table use or cooking use, whose surface is coated with a film of titanium oxide; electrons and positive holes are formed on the film of titanium oxide on the surface of the utensils due to being exposed to sunrays, an electric light or the like, whose oxidation-reaction makes clusters of water contained in food and drink, such as alcoholic drinks (Japanese sake, beer, cocktails, fruit wine and the like), milk, soft drinks and other food and drink, or other cooking materials such as soy sauce, small to improve the taste of food and drink and to make them tasty.

In addition, since the utensils for table use or cooking use according to the present invention employ only light energy, they have an effect capable of improving easily the taste of food and drink and making them tasty without using particular energy in a short time. Besides, since residual chlorine, the odor of chlorine and the odor of mold can be decomposed, the taste of water itself can be improved. Moreover, titanium oxide to be used in the present invention is generally used also for coatings, cosmetics and tooth powder and has an advantage being durable, non-toxic and innoxious for health. Accordingly, the utensils for table use or cooking use according to the present invention can be used semipermanently and the function and effect said above can be maintained semipermanently so far as being exposed to light.

What is claimed is:

1. A utensil selected from the group consisting of a cup, glass, tumbler, jugs, pitcher, bottle, thermos bottle, bowl, pan, kettle, pot, jug, pad, sake bottle, teacup, rice bowl, glass vessel for mixer, spoon, chopsticks, skewer, ladle, egg beater, toothpicks muddler, and straw, comprising:

a coating on a food or beverage-contacting surface thereof, said coating consisting of photocatalytically-active titanium oxide, wherein the titanium oxide coating alters the taste of a food or beverage.

2. The utensil as claimed in claim 1, wherein said coating is in the form of ultrafine particles.

3. A method of altering the taste of a food or beverage, comprising the steps of:

contacting a food or beverage with the utensil as claimed in claim 1; and irradiating with light.

4. The method as claimed in claim 3, wherein said light is selected from the group consisting of sun light, incandescent light, fluorescent light, halogen light, xenon light, mercury light, and UV light.

\* \* \* \* \*